United States Patent
Tanaka et al.

[11] Patent Number: 5,729,378
[45] Date of Patent: Mar. 17, 1998

[54] OPTICAL DEVICE

[75] Inventors: Hideaki Tanaka; Yuichi Matsushima, both of Tokyo, Japan

[73] Assignee: Kokusai Densin Denwa Kabusiki Kaisha, Tokyo, Japan

[21] Appl. No.: 742,400

[22] Filed: Nov. 4, 1996

[30] Foreign Application Priority Data

Nov. 10, 1995 [JP] Japan ................................. 7-292704

[51] Int. Cl.⁶ ............................................. G02F 1/03
[52] U.S. Cl. ........................... 359/254; 359/315; 385/7; 385/8; 372/26; 372/12
[58] Field of Search ........................... 359/300, 305, 359/311, 315, 323, 254; 385/7, 8, 3; 372/26, 12, 10

[56] References Cited

U.S. PATENT DOCUMENTS

| | | |
|---|---|---|
| 4,532,632 | 7/1985 | Yamashita et al. ................. 385/7 |
| 4,763,973 | 8/1988 | Inoue et al. ....................... 385/7 |
| 4,941,722 | 7/1990 | Hatori ............................. 385/7 |
| 5,208,697 | 5/1993 | Schaffner et al. ................. 359/254 |
| 5,359,680 | 10/1994 | Riviere .......................... 385/8 |
| 5,381,426 | 1/1995 | Fontana et al. ................... 372/12 |
| 5,384,798 | 1/1995 | Zucker et al. .................... 372/26 |

*Primary Examiner*—Loha Ben
*Attorney, Agent, or Firm*—Christie, Parker & Hale, LLP

[57] ABSTRACT

An optical device includes a semiconductor optical modulator element (46) which is connected to an end of a signal line (42) in form of a microstrip high-frequency line and whose other electrode is connected to a ground electrode (48) by a bonding wire (50). The signal line (42) includes first and second line portions (42a, 42b). The first line portion (42a) nearer to the entrance of a high-frequency signal has a width W1 determined to adjust its characteristic impedance to 50Ω and a length L1 equal to an integer multiple of ¼ of its own guide wavelength. The second line portion (42b) has a width W2 determined to adjust its impedance to an intermediate value between the impedance of the optical modulator element 46 and the impedance of the first line portion (42a), and a length L2 equal to an integer multiple of ¼ of its own guide wavelength.

16 Claims, 4 Drawing Sheets

OPTICAL DEVICE

BACKGROUND OF THE INVENTION

This invention relates to an optical device and, more particularly, to a high-speed optical device usable for generation of ultrashort optical pulses such as optical soliton pulse and for optical phase modulation in optical transmission.

Semiconductor optical elements are regarded as concentrated constant elements while high-speed optical elements (such as those using lithium niobate) are considered distributed constant elements. Although high-speed optical elements are convenient for making a signal transmission line in the element itself or integrally with the element, it is difficult to make such a signal transmission line integrally with semiconductor optical elements. A distributed constant line, such as coplanar high-frequency line or microstrip high-frequency line, is typically used as a signal transmission line for a semiconductor optical element because it must cope with signals in a very high frequency range on the order of decades of gigahertz.

FIG. 6 shows the perspective view of an outer appearance of a conventional phase modulator using a semiconductor optical element. In the phase modulator of FIG. 6, a semiconductor optical modulator element is driven through a coplanar high-frequency line whose impedance is adjusted to 50Ω. The semiconductor optical modulator element 14 is bonded on the signal line 12 on a substrate 10, and the upper electrode of the optical modulator element 14 is coupled by a bonding wire 16 to a ground line 18 which is coplanar with the signal line 12. A high-frequency signal source 20 is connected between one end of the signal line 12 and the ground line 18. The other end of the signal line 12 and the ground line 18 are terminated at a terminal resistor 22.

The conventional phase modulator exhibits frequency response characteristics as shown in FIG. 7 taking responses on the vertical axis and frequencies on the horizontal axis. The response characteristics are substantially flat from the direct current, but suddenly drop from a certain frequency fc.

In the conventional phase modulator, the cutoff frequency fc is determined by the product of the impedance of the high-frequency line and the electrostatic capacitance of the optical modulator element 14. For example, if the electrostatic capacitance of the optical modulator element 14 is about 0.3 pF, then fc is about 20 GHz. Considering that optical fiber can be used in much wider bands, it is desired that optical elements can be driven even in higher frequency ranges.

The voltage applied to the optical modulator element 14 in the conventional phase modulator coincides with the input voltage to the high-frequency line in the flat portion of the response characteristics. Therefore, in order to apply a higher voltage to the optical modulator element 14, a higher input voltage must be applied to the high-frequency line.

SUMMARY OF THE INVENTION

It is therefore an object of the invention to provide an optical device which is responsive also to higher frequency signals.

A further object of the invention is to provide an optical device in which the input voltage may be lower than that of a conventional device.

In an optical device according to the invention, a signal line of a high-frequency line, which couples an optical element to an external transmission line, includes a plurality of line portions which stepwise vary in characteristic impedance from the characteristic impedance of the external transmission line to the impedance of the optical element, and each of the line portions has a length equal to an integer multiple of ¼ of its guide wavelength. For example, the characteristic impedances are stepwise changed by changing widths of the line portions.

Since the lengths of the respective line portions are integer multiples of ¼ of their own guide wavelengths, reflection at one or more boundaries between the line portions can be reduced to zero theoretically, and signals can be transmitted with no or minimum loss even in a higher frequency range.

By stepwise variation in impedance, also a high-impedance optical element even can be driven efficiently. Since the voltage applied to the optical element is made higher than the input voltage, the voltage at the input may be decreased.

In an aspect of the invention, the optical device may further include an optical input means for introducing external light to the optical element and a coupling means connecting the external transmission line to the high-frequency line. Then, the arrangement of the optical device suitable for forming a received light processing module can be obtained. The optical input means preferably includes an input light guide means for introducing external light and an input lens element for orienting an optical signal from the input light guide means to a predetermined portion of the optical element.

In another aspect of the invention, the optical device may include an optical output means for outputting light from the optical element and a coupling means connecting the external transmission line to the high-frequency line. Then, the arrangement of the optical device suitable for forming an optical output module can be obtained. The optical output means preferably includes an output light guide means for externally guiding an optical signal and an output lens element for orienting light from the optical element to the output light guide means.

In another aspect of the invention, the optical device may include an optical input means for introducing external light to the optical element, an optical output means for externally sending light from the optical element, and a coupling means connecting the external transmission line to the high-frequency line. Then, the arrangement of the invention suitable for forming an optical module for introducing external light and externally sending out processed (for example, modulated) light can be obtained. The optical input means preferably includes an input light guide means for introducing external light and an input lens element for orienting the light from the input light guide means to a predetermined portion of the optical element. The optical output means preferably includes an output light guide means for externally guiding an optical signal and an output lens element for orienting light from the optical element to the output light guide means.

DESCRIPTION OF THE PREFERRED EMBODIMENTS

Embodiments of the invention are described below in detail with reference to the drawings.

Figure 1:
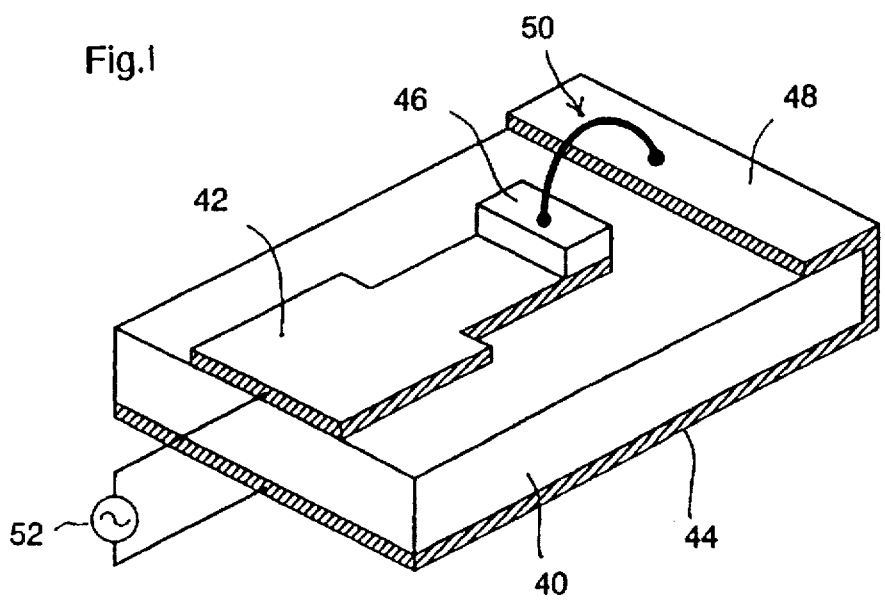
FIG. 1 is an outer perspective view of an embodiment of the invention using a microstrip high-frequency line.
Figure 2:
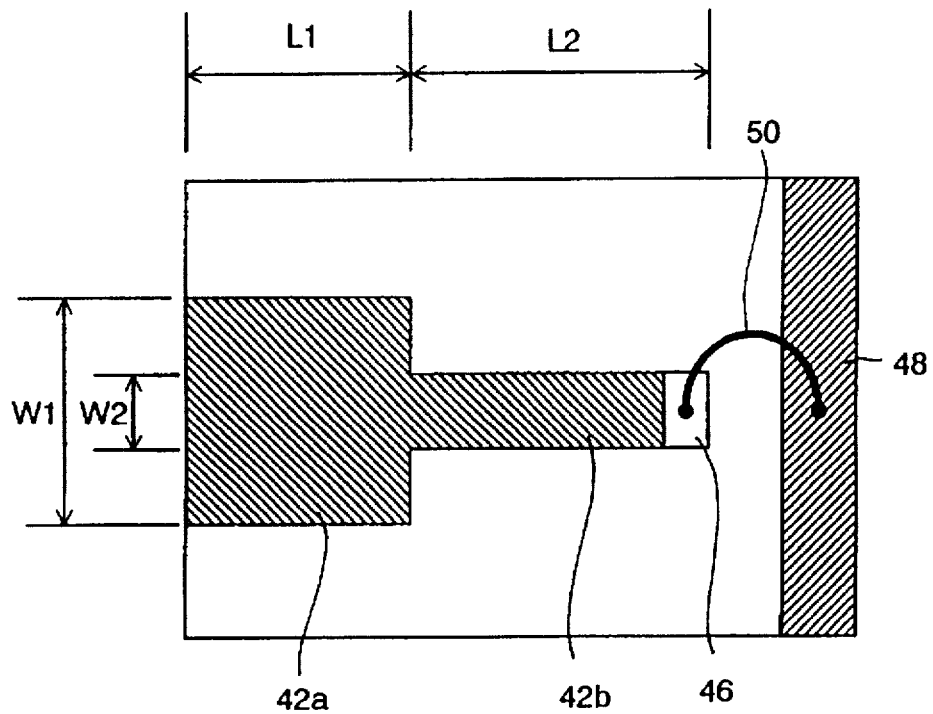
FIG. 2 is a plan view of the embodiment shown in FIG. 1.

FIG. 1 is an outer perspective view of an embodiment of the invention, which is an optical modulator device using a microstrip high-frequency line. FIG. 2 is a plan view of the same device. A conductive layer for forming a signal line 42 is bonded on the front surface of a 2.5 mm thick ceramic substrate 40 having the dielectric constant of 6.4, and a conductive for forming a ground line 44 is bonded on the back surface of substrate 40. Electrically bonded on a distal end of the signal line 42 is a semiconductor optical modulator element 46 having a heat sink. In the embodiment shown here, the optical modulator element 46 is an InGaAsP electric absorbing optical modulator element having the impedance of 5 kΩ. The heat sink and the semiconductor optical modulator element 46 are shown integral in FIG. 1.

A ground electrode 48 is provided on a part of the front surface of the substrate 40 near the optical modulator element 46, and is connected to a front electrode of the optical modulator element 46 by a bonding wire 50. The ground electrode 48 is made by extending the conductive layer forming the ground line 44 from the back surface of the substrate 40 via a side surface of the substrate 40 up to an end portion of the front surface.

A high-frequency signal source 52 for generating a drive signal to the optical modulator element 46 is coupled to both the ground line 44 and the signal line 42 by a coaxial cable or other appropriate high-frequency transmission means.

The signal line 42 consists of two line portions 42a and 42b as clearly shown in FIG. 2. In a 50Ω system typically employed in broadband optical transmission, the first line portion 42a nearer to the entrance of the high-frequency signal has a width W1 that is chosen such that its characteristic impedance is 50Ω. In a 75Ω system, the width W1 is chosen such that the characteristic impedance is 75Ω. The length L1 of the first line portion 42a is selected to be n/4 (n is 1 or any larger integer which is appropriately in the range from 1 to 6 in typical cases) of its guide wavelength so that the transmitting signal connects from the first line portion 42a to the second line portion 42b with no reflection. In a specific version examined, width W1 of the line portion 42a was 3.5 mm, and the length L1 was 3.5 mm.

The width W2 of the second line portion 42b is determined such that its impedance is an intermediate value between the impedance of the optical modulator element 46 and the impedance of the first line portion 42a. The length L2 of the second line portion 42b is chosen to be m/4 (m is 1 or any larger integer which is appropriately in the range from 1 to 6 in typical cases) of its guide wavelength so that no reflection occurs at the open end of the second line portion 42b. In a specific version examined, the second line portion 42b was designed to have the characteristic impedance of 125Ω, width W2 of 0.3 mm, and length L2 of 3.7 mm. Since the line portion 42b has the optical modulator element 46 connected at its distal end, this end is not an open end in a strict sense; nevertheless, it may be regarded as a substantial open end from the viewpoint of the difference in impedance. Of course, the length L2 can possibly be adjusted appropriately because an element (element 46 in this embodiment) is connected to the distal end.

Briefly explained below are behaviors of the device shown in FIG. 1. A high-frequency signal output from the high-frequency signal source 52 is introduced into the signal line 42. Since the characteristic impedance of the first line portion 42a at the input side of the signal line 42 is 50Ω, and because it coincides with the characteristic impedance, 50Ω, of the transmission line from the high-frequency signal source 52, the high-frequency signal from the high-frequency signal source 52 enters in and propagates through the line portion 42a with substantially no reflection. Since the length of the line portion 42a is an integer multiple of ¼ of its guide wavelength, reflection at the boundary between the first and second line portions 42a and 42b becomes zero theoretically even when these line portions 42a and 42b are different in characteristic impedance. Thus, the high-frequency signal traveling through the first line portion 42a enters the second line portion 42b without loss.

The high-frequency signal traveling through the second line portion 42b is applied to the optical element 46. Note here that, because the length of the second line portion 42b is an integer multiple of ¼ of its guide wavelength, reflection at the junction between the second line portion 42b and the optical element 46 can be decreased to zero, theoretically, even when the impedance of the optical element 46 is different from the characteristic impedance of the second line portion 42b.

Actually, of course, a small amount of reflection may occur at the boundary between the first and second line portions 42a and 42b and at the junction between the second line portion 42b and the optical element 46 due to product errors; however, a large amount of reflection does not occur.

Because the high-frequency signal propagates without reflection, theoretically, from the first line portion 42a to the second line portion 42b, which are different in characteristic impedance, the amplitude of the high-frequency signal becomes larger in the second line portion 42b than in the first line portion 42a. Therefore, a voltage with a larger amplitude than the incoming signal to the signal line 42 is applied to the optical element 46.

Although the embodiment has been shown and illustrated as dividing the signal line 42 into two line portions 42a and 42b, the signal line 42 may be divided into three or more portions. These portions are made to have different characteristic impedances determined to stepwise vary toward the impedance of the optical element 46 and to have lengths chosen to be integer multiples of ¼ of their own guide wavelengths.

Figure 3:
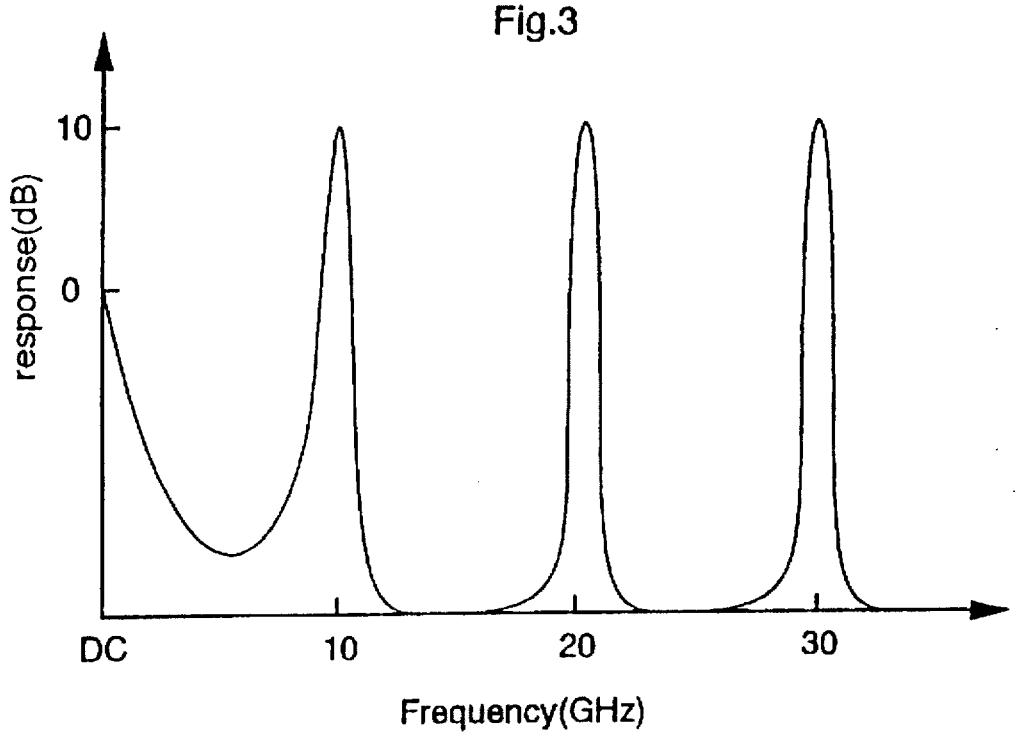
FIG. 3 is a diagram of frequency response characteristics of the embodiment shown in FIGS. 1 and 2.

FIG. 3 shows frequency characteristics of the embodiment shown above. A larger frequency response than that near DC can be obtained, every 10 GHz, even when the frequency increases to 30 GHz or higher. Such characteristics could not be obtained with conventional devices. When a high-frequency signal with the amplitude of 2V (with the frequency of 10 GHz) was applied to the signal line 42, a voltage with the amplitude of 20V was applied to the optical element 46. That is, a voltage amplifying function of the embodiment was confirmed.

Figure 4:
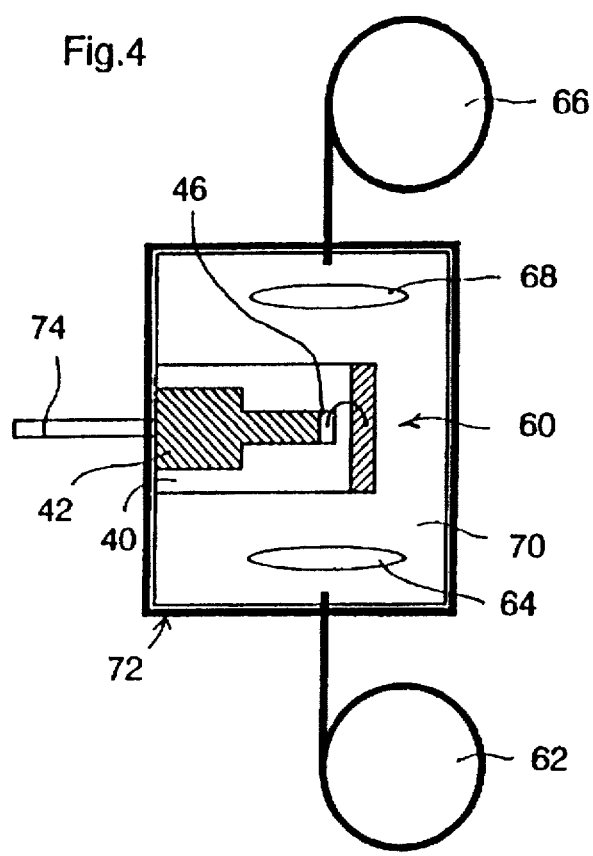
FIG. 4 is a plan view of an optical modulator device using the embodiment.

FIG. 4 is a plan view of an arrangement in the form of a device using the embodiment shown in FIGS. 1 and 2. The same or equivalent members or elements as those of FIGS. 1 and 2 are labeled with the same reference numerals. Fixed on a base 70 are a device 60 corresponding to the device shown in FIG. 1, a lens 64 for converging and orienting incoming light from an optical fiber 62 onto the optical modulator element 46 in the device 60, and a lens 68 for converging and orienting light from the optical modulator element 46 to an optical fiber 66. These elements are sealed by a case 72 mounted on the base 70. An output end of the optical fiber 62 and an input end of optical fiber 66 are fixed to the case 72 at the predetermined positions, respectively. A coaxial cable 74 of a predetermined length is electrically connected to the signal line 42 and the ground line 44 by using a known coupling structure.

Distal ends of the optical fibers 62 and 66 are typically shaped into flat planes vertical of the optical axis, but may be spherically shaped. That is, spherical-nose fibers may be used as the optical fibers 62 and 66. In this case, the lenses 64 and 68 are regarded integral with the optical fibers 62 and 66.

All or part of the functions of lenses 64 and 68 may be built into end portions of the optical element 46. In this case, the device does not need separate lenses 64 and 68 in its appearance.

Figure 5:
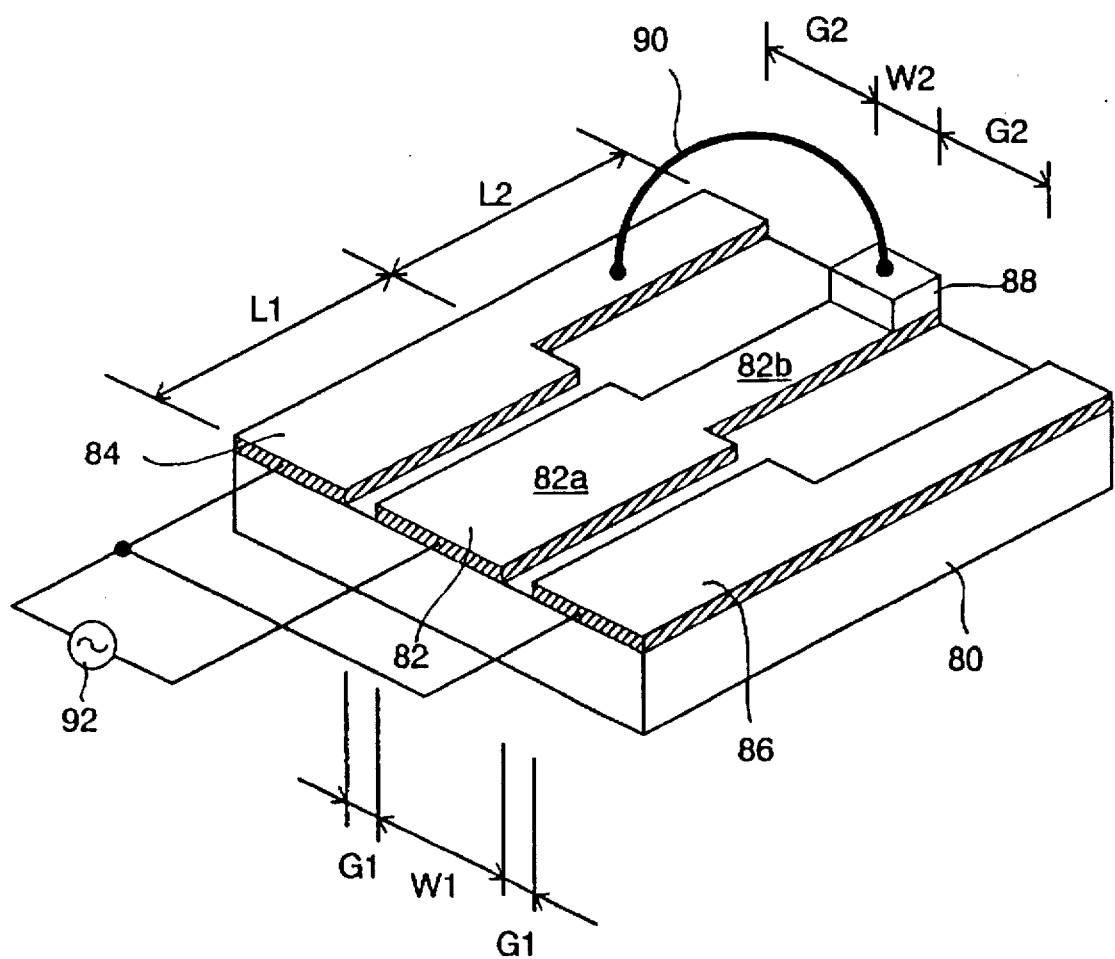
FIG. 5 is a perspective view of a further embodiment of the invention using a coplanar high-frequency line.
Figure 6:
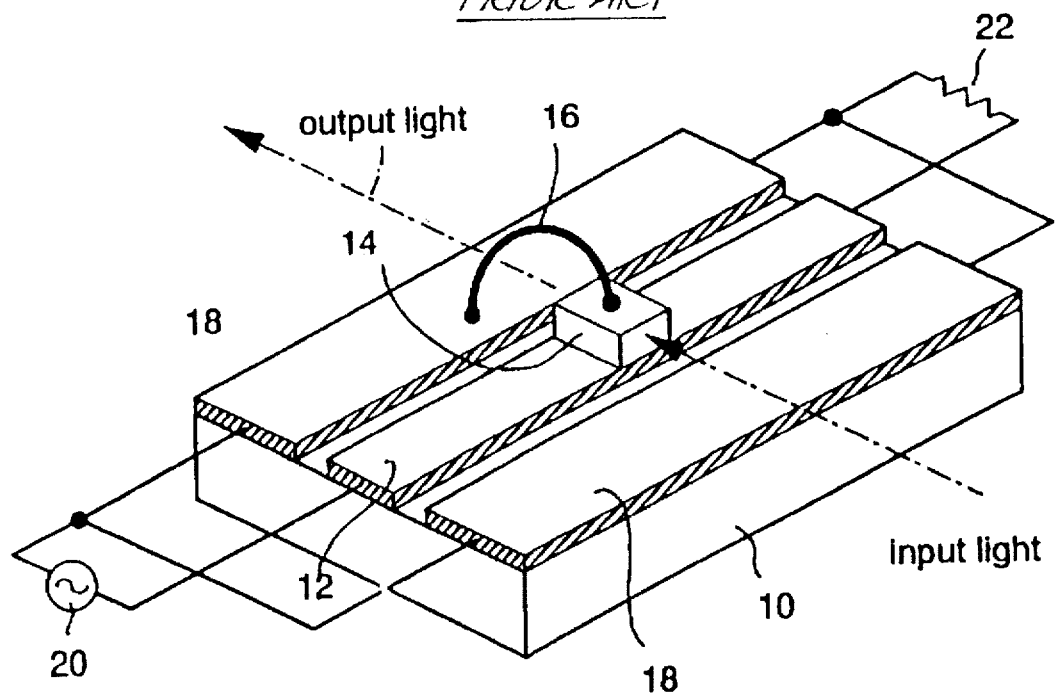
FIG. 6 is a perspective view of a conventional device using a coplanar high-frequency line.
Figure 7:
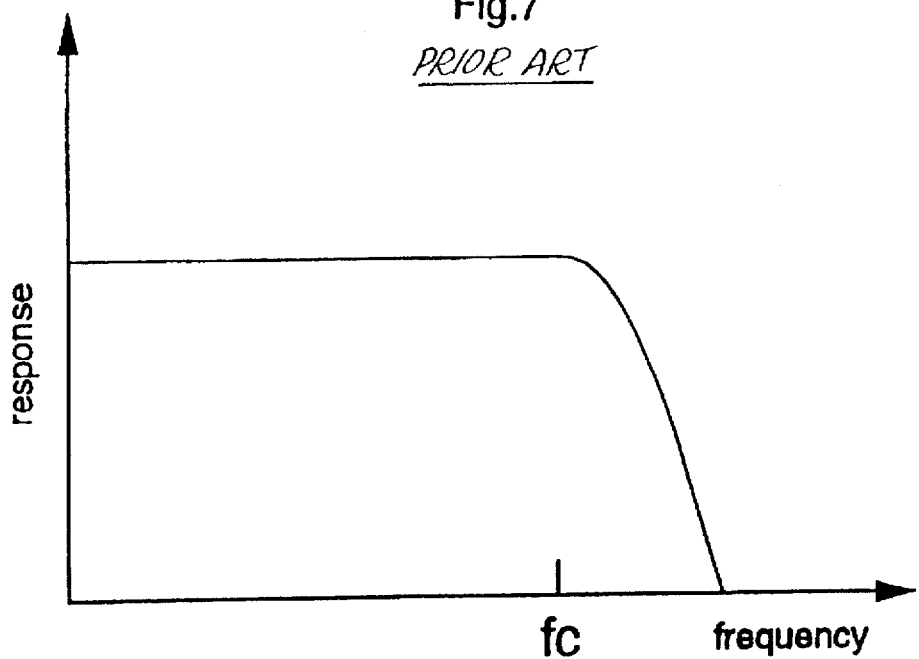
FIG. 7 is a diagram of frequency response characteristics of the conventional device.

The present invention is applicable also when a coplanar high-frequency line is used. FIG. 5 is a perspective view of an embodiment using a coplanar high-frequency line. On a front surface of a ceramic substrate 80, a conductor for use as a signal line 82 is bonded, and conductors for use as ground lines 84, 86 are bonded or formed at opposite sides of the signal line 82. On the distal end of the signal line 82, a semiconductor optical modulator element 88 with a heat sink is coupled or formed. Also in FIG. 5, like in FIG. 1, the heat sink and the semiconductor optical modulator element 88 are shown integral. The upper electrode of the optical modulator element 88 is connected to the ground line 84 (or 86) by a bonding wire 90. A high-frequency signal source 92 is connected to the signal line 82 and ground lines 84, 86 by a coaxial cable or other appropriate high-frequency signal transmission means.

Similarly to the embodiment shown in FIGS. 1 and 2, the signal line 82 is divided into a first line portion 82a at the input side of the high-frequency signal and a second line portion 82b to which the optical element 88 is connected. The length L1 of the first line portion 82a is an integer multiple of ¼ of its guide wavelength, and the length L2 of the second line portion 82b is an integer multiple of ¼ of its guide wavelength. The width W1 of the first line portion 82a and the gap length G1 from it to the ground lines 84, 86 are determined such that the characteristic impedance of the line portion 82a is 50Ω. The width W2 of the line portion 82b and the gap length G2 from it to the ground lines 84, 86 are determined such that the characteristic impedance of the line portion 82b be an intermediate value between 50Ω and the impedance of the semiconductor optical element 88.

Also when the coplanar high-frequency line is used, the ground electrodes may lie under a part or the entirety of the back surface of the substrate 80.

Behaviors of the embodiment shown in FIG. 5 are the same as those of the embodiment shown in FIG. 1, and are not explained here to avoid redundancy.

The present invention is most effective when the impedance of the optical element 46 or 88 is higher than the characteristic impedance of the transmission line between the element 46 or 88 and the high-frequency signal source or the received signal processing circuit. When, in contrast, an impedance of an optical element is lower than the characteristic impedance of the transmission line between the optical element and the high-frequency signal line or the received signal processing circuit, the impedance of the optical element may be matched with the characteristic impedance by inserting a resistor element in series to the optical element.

Although the embodiments have been described as using a semiconductor optical modulator element as the optical element 46 or 88, any other optical element may be used among light receiving elements, optical switches, optical amplifier elements, semiconductor lasers, and so forth.

From the explanation made above, those skilled in the art will understand that the present invention makes it possible to use an optical element even in a higher frequency range, and contributes to realization of optical transmission in the order of decades of gigahertz.

It will also be understood that, when a high-frequency signal is used to drive an optical element, the invention can lower the voltage amplitude of the input high-frequency signal because applied to the optical device is a higher voltage than the voltage amplitude of the input high-frequency signal.

What is claimed is:

1. An optical device including an optical element and a high-frequency line connecting the optical element to an external transmission line, comprising:

said high-frequency line comprising a signal line having a plurality of line portions whose characteristic impedances vary stepwise from the characteristic impedance of said external transmission line to the impedance of said optical element; and each of said line portions comprising a length substantially equal to an integer multiple of ¼ of its own guide wavelength.

2. The optical device according to claim 1 wherein said line portions are different in width, in accordance with respective characteristic impedances thereof.

3. The optical device according to claim 1 or 2 wherein said optical element is connected to a downstream end of said signal line of said high-frequency line.

4. The optical device according to claim 1 wherein said high-frequency line comprises a ground line, and said optical line is coupled to said ground line by a bonding wire.

5. The optical device according to claim 1 wherein said signal line has two said signal line portions.

6. The optical device according to claim 1 wherein said optical element is a semiconductor optical element.

7. The optical device according to claim 1 wherein said high-frequency line is a microstrip high-frequency line.

8. The optical device according to claim 1 wherein said high-frequency line is a coplanar high-frequency line.

9. The optical device according to claim 1 wherein said optical device further comprises an optical input means for guiding external light to said optical element, and coupling means for connecting said external transmission line to said high-frequency line.

10. The optical device according to claim 9 wherein said optical input means comprises input light guide means for introducing external light, and an input lens element for orienting an optical signal from said input light guide means to a predetermined portion of said optical element.

11. The optical device according to claim 1 wherein said optical device further comprises an optical output means for outputting light externally from said optical element, and coupling means for connecting said external transmission line to said high-frequency line.

12. The optical device according to claim 11 wherein said optical output means comprises output light guide means for externally guiding light, and an output lens element for orienting light from said optical element to said output light guide means.

13. The optical device according to claim 1 wherein said optical device comprises optical input means for introducing external light to said optical element, optical output means for externally outputting light from said optical element, and coupling means for connecting said high-frequency line to said external transmission line.

14. The optical device according to claim 13 wherein said optical input means comprises input light guide means for introducing external light, and an input lens element for orienting an optical signal from said input light guide means to a predetermined portion of said optical element.

15. The optical device according to claim 13 wherein said optical output means comprises output light guide means for externally guiding an optical signal, and an output lens element for orienting light from said optical element to said output light guide means.

16. The optical device according to claim 1 wherein the impedance of said optical element is higher than the characteristic impedance of the signal line.

* * * * *